US009762620B2

(12) United States Patent
Iovieno et al.

(10) Patent No.: US 9,762,620 B2
(45) Date of Patent: *Sep. 12, 2017

(54) LAWFUL INTERCEPTION FOR 2G/3G EQUIPMENT INTERWORKING WITH EVOLVED PACKET SYSTEM

(71) Applicant: TELEFONAKTIEBOLAGET L M ERICSSON (PUBL), Stockholm (SE)

(72) Inventors: Maurizio Iovieno, Salerno (IT); Raffaele de Santis, Mercato San Severino (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,749

(22) Filed: Apr. 21, 2015

(65) Prior Publication Data

US 2015/0229675 A1 Aug. 13, 2015

Related U.S. Application Data

(63) Continuation of application No. 13/055,021, filed as application No. PCT/EP2008/059733 on Jul. 24, 2008, now Pat. No. 9,042,388.

(51) Int. Cl.
*H04W 12/02* (2009.01)
*H04L 29/06* (2006.01)
(Continued)

(52) U.S. Cl.
CPC .............. *H04L 63/30* (2013.01); *H04L 47/32* (2013.01); *H04L 63/00* (2013.01); *H04L 63/304* (2013.01);
(Continued)

(58) Field of Classification Search
CPC ........ H04L 63/00; H04L 63/30; H04W 28/10; H04W 88/16; H04W 8/082; H04W 88/08
(Continued)

(56) References Cited

U.S. PATENT DOCUMENTS 8,218,535 B1 7/2012 Hurtta et al.
8,400,927 B2 3/2013 Attanasio et al.
(Continued)

FOREIGN PATENT DOCUMENTS

CN 1586054 A 2/2005
WO 03/081927 A1 10/2003

OTHER PUBLICATIONS

3rd Generation Partnership Project; Technical Specification Group Services and System Aspects; General Packet Radio Service (GPRS) enhancements for Evolved Universal Terrestrial Radio Acccess Network (E-UTRAN) access (Release 8). 3 GPP TS 23.401 v8.2.0 (Jun. 2008).
(Continued)

*Primary Examiner* — Steven H Nguyen
*Assistant Examiner* — Emmanuel Maglo

(57) ABSTRACT

A method, system, and a computer program product for reducing consumption of resources for lawful interception or retention data related to traffic concerning a 2G/3G target mobile connected to a telecommunications network interworking with Evolved Packet System is provided. A first parameter value in traffic for which lawful interception or data retention has been activated is detected at a first node. Based on at least the first parameter value, whether the traffic will be intercepted or retained at a second node crossed by the traffic is evaluated. If the second node will intercept or retain the traffic, the first node foregoes a lawful interception request or retention of intercepted data.

20 Claims, 5 Drawing Sheets

(51) Int. Cl.
*H04L 12/823* (2013.01)
*H04W 28/10* (2009.01)
*H04M 3/22* (2006.01)

(52) U.S. Cl.
CPC ........... *H04W 12/02* (2013.01); *H04W 28/10* (2013.01); *H04M 3/2281* (2013.01)

(58) Field of Classification Search
USPC ................ 370/235, 401; 455/466; 379/32.01
See application file for complete search history.

(56) References Cited

U.S. PATENT DOCUMENTS

| | | | |
|---|---|---|---|
| 2002/0049913 A1 | 4/2002 | Lumme et al. | |
| 2002/0078384 A1* | 6/2002 | Hippelainen | H04L 12/2602 726/13 |
| 2004/0095894 A1 | 5/2004 | Eloranta et al. | |
| 2004/0157629 A1 | 8/2004 | Kallio et al. | |
| 2004/0171379 A1* | 9/2004 | Cabrera | G06F 17/3087 455/422.1 |
| 2004/0228362 A1* | 11/2004 | Maki | H04L 63/00 370/467 |
| 2005/0152275 A1* | 7/2005 | Laurila | H04L 43/18 370/241 |
| 2005/0152401 A1* | 7/2005 | Wiljakka | H04W 8/26 370/474 |
| 2005/0176438 A1* | 8/2005 | Li | H04W 12/08 455/450 |
| 2006/0034198 A1* | 2/2006 | Makinen | H04L 63/00 370/310 |
| 2006/0212933 A1* | 9/2006 | Scoggins | H04L 63/0428 726/11 |
| 2007/0174443 A1* | 7/2007 | Shaheen | H04W 8/06 709/223 |
| 2008/0045246 A1 | 2/2008 | Murtagh et al. | |
| 2008/0102866 A1* | 5/2008 | Fiorillo | H04L 63/00 455/466 |
| 2008/0232376 A1* | 9/2008 | Huang | H04W 4/20 370/395.3 |
| 2008/0242292 A1 | 10/2008 | Koskela et al. | |
| 2008/0280609 A1 | 11/2008 | Imbimbo et al. | |
| 2009/0168697 A1* | 7/2009 | Zabawskyj | H04L 12/14 370/328 |
| 2009/0207751 A1 | 8/2009 | Attanasio et al. | |
| 2009/0216725 A1* | 8/2009 | Yaqub | G06Q 30/02 |
| 2009/0234845 A1 | 9/2009 | Desantis et al. | |
| 2009/0234956 A1* | 9/2009 | Wang | H04W 48/17 709/228 |
| 2009/0252151 A1* | 10/2009 | Rappe | H04L 12/2602 370/352 |
| 2010/0039946 A1 | 2/2010 | Imbimbo et al. | |
| 2010/0039993 A1* | 2/2010 | Ramankutty | H04W 88/16 370/328 |
| 2010/0142389 A1 | 6/2010 | Imbimbo et al. | |
| 2011/0032840 A1* | 2/2011 | Di Donato | H04L 12/2602 370/252 |
| 2011/0096750 A1 | 4/2011 | Velandy et al. | |
| 2011/0154181 A1 | 6/2011 | Kawa et al. | |
| 2011/0243024 A1* | 10/2011 | Osterling | H04L 67/104 370/252 |
| 2011/0261787 A1* | 10/2011 | Bachmann | H04L 63/029 370/331 |
| 2012/0039175 A1 | 2/2012 | Sridhar et al. | |
| 2012/0039213 A1 | 2/2012 | Cheng et al. | |
| 2012/0054809 A1 | 3/2012 | Chowdhury | |
| 2012/0063414 A1 | 3/2012 | Ramachandran | |
| 2012/0063464 A1 | 3/2012 | Mehta | |
| 2012/0124229 A1 | 5/2012 | Sahu et al. | |
| 2012/0166618 A1 | 6/2012 | Dahod et al. | |
| 2012/0170548 A1 | 7/2012 | Rajagopalan et al. | |
| 2012/0269167 A1 | 10/2012 | Velev et al. | |

OTHER PUBLICATIONS

3rd Generation Partnership Project; Technical Specification Group Services and System Aspects; General Packet Radio Service (GPRS); Service description; Stage 2 (Release 8). 3GPP TS 23.060 V8.1.0 (Jun. 2008).

Lawful Interception (LI); Retained Data. ETSI TS 102 656. ETSI Standards, LIS. No. V1.1.1. Nov. 2007.

"Universal Mobile Telecommunications System (UMTS); 3G security; Lawful interception architecture and functions (3GPP TS 33.107 version 7.7.0 Release 7); ETSI TS 133 107," ETSI Standards, LIS, Sophia Antipolis Cedex, France, vol. 3-SA3, No. V7.7.0 Oct. 1, 2007.

Ericsson: "Updates on TS 33.107 to support LI for EPS," 3GPP Draft; SA3LI08_042 Vancouver Outcome, CR-33107 EPC_ MODIFICATION, 3rd Generation Partnership Project (3GPP), Mobile Competence Centre, 650, Route des Lucioles, F-06921 Sophia Antipolis Cedex, France, vol. 1, SA WG3, No. Vancouver: Apr. 23, 2008.

* cited by examiner

LAWFUL INTERCEPTION FOR 2G/3G EQUIPMENT INTERWORKING WITH EVOLVED PACKET SYSTEM

RELATED APPLICATIONS

This application is a continuation of U.S. Ser. No. 13/055,021, filed Jan. 20, 2011, which was a 371 of PCT/EP2008/059733, filed Jul. 24, 2008, the disclosures of which are fully incorporated herein by reference.

TECHNICAL FIELD

The present invention relates to methods and arrangements in a telecommunications system for providing interception or retention data to lawful interception requesting entities, particularly in case of 2G/3G networks interworking with the Evolved Packet System.

BACKGROUND

In many countries telecommunications operators and Internet service providers are today obliged by legal requirements to provide Law Enforcement Agencies (LEAs) with stored traffic data generated from public telecommunications for the purpose of detection, investigation and prosecution of crime and criminal offences.

A system for accessing communications related data is the well known Lawful Interception (LI) system. The standard architecture comprises Intercepting Control Elements (ICEs) providing the user equipment of the target user with an access to the telecommunications network. An Intercepting Control Element may be, for instance, a 3G Mobile service Switching Center (MSC) Server, a 3G Gateway MSC Server, a Serving GPRS Support Node (SGSN), or a Gateway GSN (GGSN).

The architecture may further comprise one or more Law Enforcement Monitoring Facilities (LEMFs) through which respective Law Enforcement Agencies receive interception information.

An Administration Function (ADMF) entity may be configured for sending the target identity and Lawful Interception authorisation data from the Law Enforcement Agencies to the Intercepting Control Elements.

Every physical Intercepting Control Element may be linked to the ADMF by means of its own X1_1 interface. Consequently, every single Intercepting Control Element may perform interception, i.e. activation, deactivation, interrogation as well as invocation, independently from other Intercepting Control Elements.

2G/GSM and 3G/UMTS are key mobile communication technologies, used by more than two-billion people around the world. In order to adapt to new services, increasing demand for user bandwidth, quality of service and requirements for network convergence, evolutions are often introduced in 3G network standard.

In this context, Evolved Packet System (EPS) is a major evolution of the 3G/UMTS standard introduced by the 3rd Generation Partnership Project (3GPP) standard committee. EPS is defined by 3GPP in Release 8 as an entirely new core network with a flatter all-IP architecture enabling a higher data rate and lower latency packet optimised system that supports multiple radio access technologies, focusing on the packet-switched domain.

In view of the widespread diffusion of 2G and 3G technologies, 3GPP specifications allow 2G/3G networks to interwork with Evolved Packet System, a situation that frequently happens e.g. whenever a 2G/3G terminal is used in a network whose operator has also deployed Evolved Packet System.

3GPP specifications include functional requirements for Lawful Interception. Technical specification ETSI DTS/LI-00039 gives guidance for the delivery and associated issues of retained data of telecommunications and subscribers. In particular, such specification provides a set of requirements relating to Handover Interfaces for the retained traffic data and subscriber data by law enforcement and other authorized requesting authorities. Technical Specification ETSI DTS/LI-00033 contains handover requirements and a handover specification for the data that is identified in EU Directive 2006/24/EC on retained data.

In case of interworking between 2G/3G and the Evolved Packet System, Lawful Interception is to be performed in different nodes, in particular in three different nodes where, in some cases, two nodes out of three may belong to the same network. This situation creates multiple instances of intercept products for the same target subscriber, a situation that may negatively affect the performance of the nodes involved in Lawful Interception, on the side of both the operator and of the Law Enforcement Agency, in terms of bandwidth and, in general, in terms of usage of resources.

SUMMARY

The aim of the present invention is to overcome the above mentioned drawbacks, by disclosing a method and a system that reduce usage of resources for satisfying lawful interception requirements.

This aim and other objects which will become better apparent hereinafter are achieved by a method and a system that avoid redundancy of interception requests and of intercepted data.

According to a first aspect of the invention, Lawful Interception on a node is skipped when the node is able to determine that Lawful Interception is also performed at another node in the same network.

According to a second aspect of the invention, intercepted data from a node is discarded when the intercepted data would result in multiple instances of the same data.

More in detail, the aim and objects of the invention are achieved by a method for reducing consumption of resources for lawful interception or retention data related to traffic concerning a 2G/3G target mobile connected to a telecommunications network interworking with Evolved Packet System, comprising the steps of: at a first node, detecting at least a parameter value in data for which lawful interception or data retention has been activated; based on said at least parameter value, evaluating whether said traffic is intercepted or retained at a second node crossed by said traffic in the same network; filtering out lawful interception requests or intercepted data if said second node is located downstream of said first node.

The above aim and objects are also achieved by a Lawful Interception system for interception or retention of data related to traffic associated with a target user equipment in a 2G/3G telecommunications network interworking with Evolved Packet System, wherein at least a first node and a least a second node are configured to operate as Intercepting Control Elements or Data Retention sources, wherein said first node is configured to detect at least a parameter value in data for which lawful interception or data retention has been activated and, based on said parameter value, to filter out lawful interception requests or intercepted data if said second node is located downstream of said first node.

The present invention also concerns computer programs comprising portions of software codes in order to implement the method according to the invention when operated at a processor of an Intercepting Control Element or a Data Retention source. A computer program may be loadable into at least one of an Serving GPRS Support Node or a Serving Gateway to configure said Serving GPRS Support Node or Serving Gateway as Intercepting Control Element or Data retention source operable in a Lawful Interception system according to the invention.

Such a computer program can be stored on a computer readable medium, which may be a permanent or rewritable memory within the Intercepting Control Element or Data Retention source or can be located externally. The respective computer program may also be transferred to the Intercepting Control Element or Data Retention source, for example via a cable or a wireless link as a sequence of signals.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
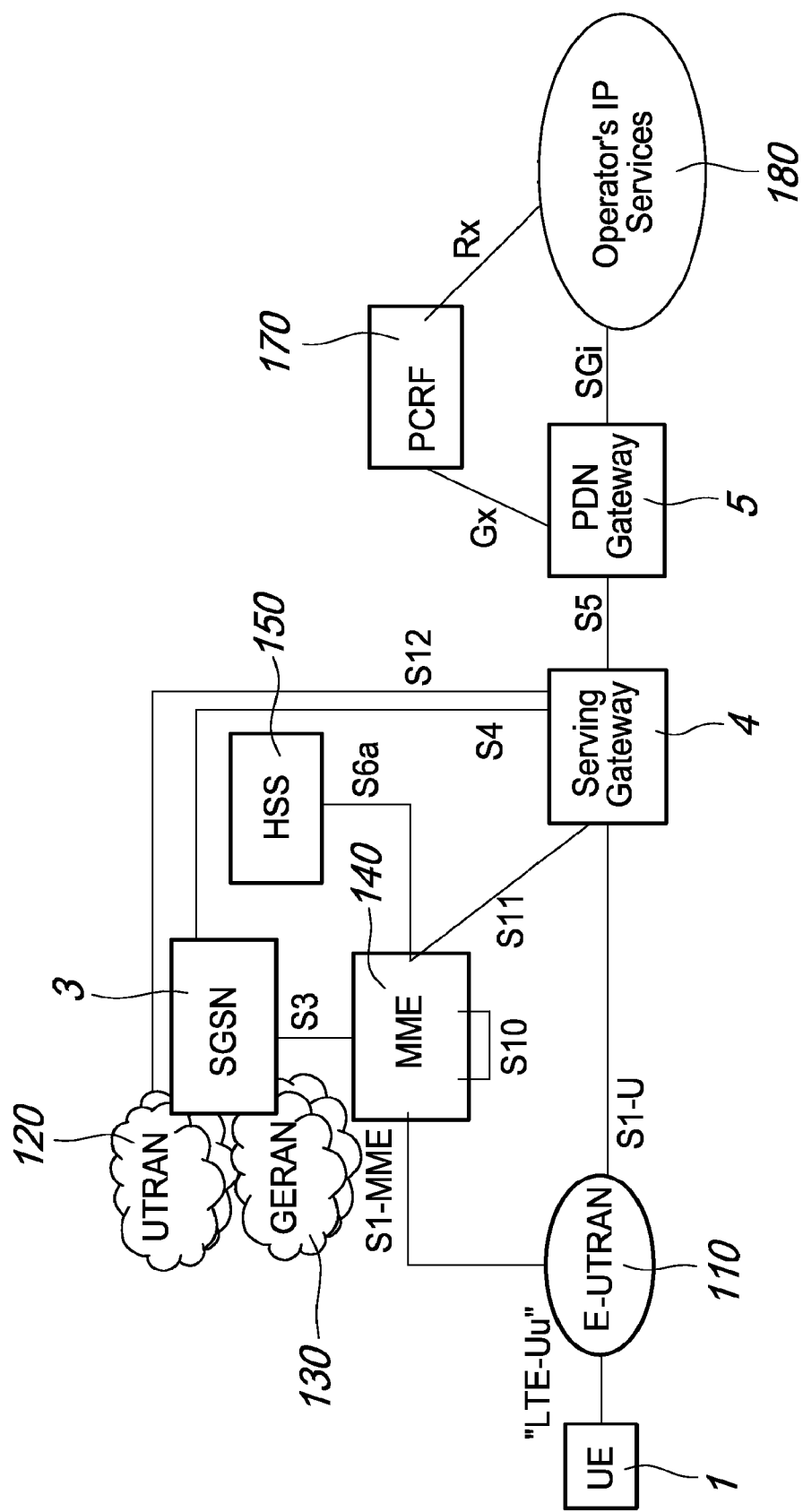
FIG. 1 is a block diagram of the Evolved Packet System architecture in a non roaming scenario.

An Evolved Packet System architecture in case of a non roaming scenario is depicted in FIG. 1. The architecture comprises a target mobile or User Equipment (UE) 1, Enhanced-UTRAN (E-UTRAN) 110, Universal Terrestrial Radio Access Networks (UTRAN) 120 and GSM EDGE Radio Access Network (GERAN) 130, Serving GPRS Support Node (SGSN) 3, Mobility Management Entity (MME) 140, Home Subscriber Server (HSS) 150, Serving Gateway (S-GW) 4, Packet Data Network (PDN) Gateway 5, Policy Charging Rule Function (PCRF) 170, and Operator's IP services 180.

Some of the nodes depicted in FIG. 1 may operate as Intercept Control Elements of a Lawful Interception system, particularly Serving GPRS Support Node 3, Serving Gateway 4 and Packet Data Network Gateway 5.

The Serving GPRS Support Node 3 is responsible for the delivery of data packets from and to the mobile stations within its geographical service area. Lawful Interception may be needed in Serving GPRS Support Node 3 as it handles Mobility Management events and is also in a position in the network to intercept subscribers in the Visited Public Land Mobile Network (VPLMN) in case the Gp interface is used between different countries.

The Serving Gateway 4 is the gateway that terminates the interface towards E-UTRAN. For each User Equipment 1 associated with the Evolved Packet System, a single Serving Gateway 4 is active at a given time. Lawful Interception is required at the Serving Gateway 4 to intercept E-UTRAN attached subscribers.

The Packet Data Network Gateway 5 is the gateway that terminates the SGi interface towards the Packet Data Network. If a User Equipment 1 is accessing multiple Packet Data Networks, more than one Packet Data Network Gateway may be active for that User Equipment 1. In the scenarios describer by 3GPP TS 23.401, Lawful Interception is required at the Packet Data Network Gateway 5 to intercept in the Home Public Land Mobile Network (HPLMN) subscribers roaming to a different Visited Public Land Mobile Network.

Traffic involving a 2G/3G attached subscriber 1 may be handled in a Serving GPRS Support Node 3 by using the so called "dual track". Gn/Gp interface can be used towards a GGSN while S4/S12 interfaces can be used with a Serving Gateway 4.

According to the 3GPP standard, a Serving GPRS Support Node 3 supporting both Gn/Gp and S4/S12 interfaces shall, for all active Packet Data Network connections for a certain User Equipment 1, use either S4 or Gn/Gp. Each Serving GPRS Support Node 3 is therefore rejecting a PDP context activation violating this in the following way. If User Equipment 1 is sending an Activate Packet Data Protocol context request for an Access Point Name using Gn, the activation is rejected by the Serving GPRS Support Node 3 if a PDP context using S4 already exists for User Equipment 1.

If User Equipment 1 is sending an Activate PDP context request for an Access Point Name using S4, the activation is rejected by Serving GPRS Support Node 3 if a PDP context using Gn already exists for this User Equipment 1.

Figure 4:
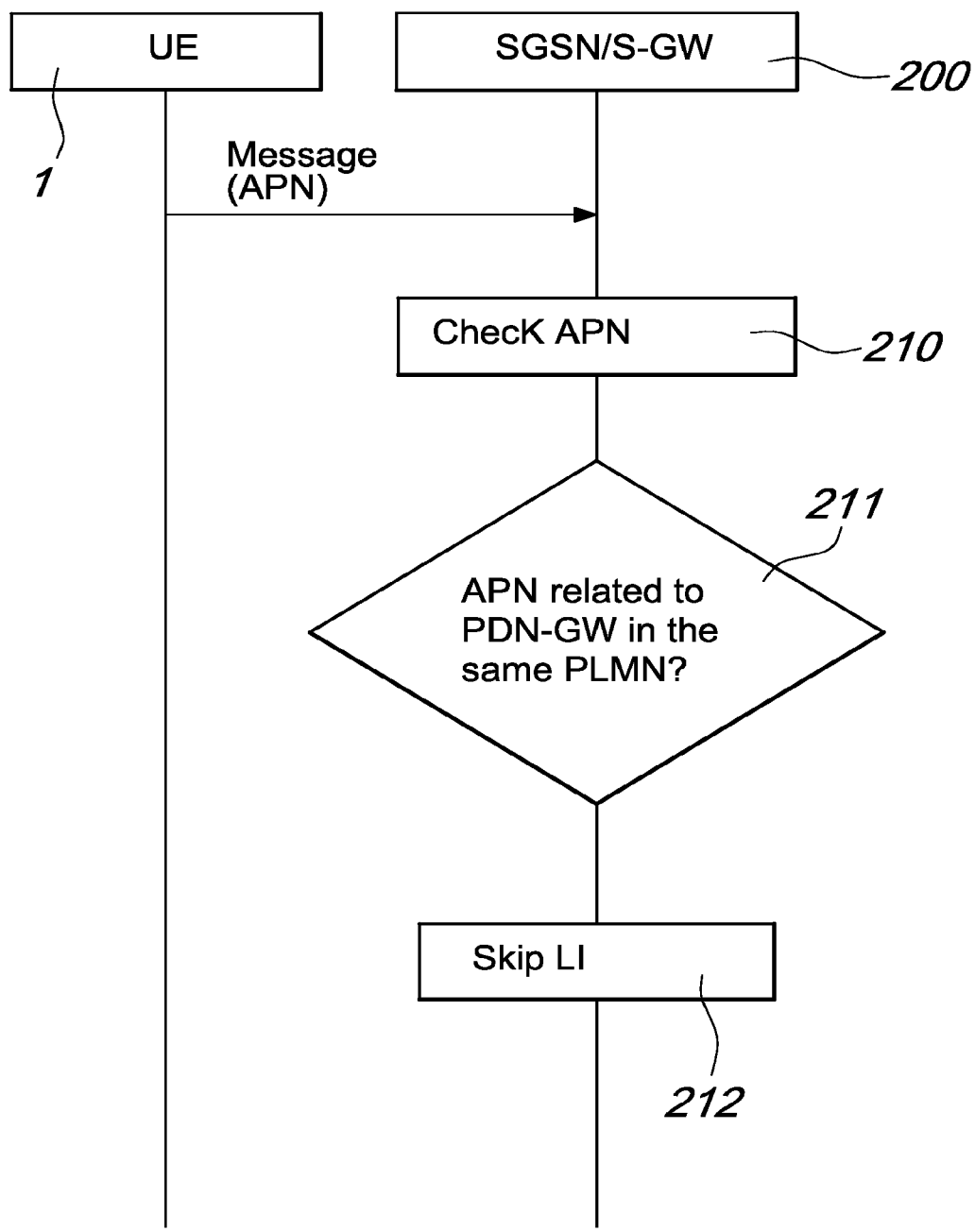
FIG. 4 is a flow diagram showing a method for skipping Lawful Interception according to one aspect of the present invention.

A method for optimising consumption of resources for lawful interception or retention data according to a first aspect of the present invention is now described with respect to data flow of FIG. 4.

FIG. 4 shows two network elements, namely a User Equipment 1 and a network node 200, which can be either a Serving GPRS Support Node 3 or a Serving Gateway 4.

When a message is sent by User Equipment 1 to the Serving GPRS Support Node 3 or to the Serving Gateway 4, a parameter value from which a route of the user's traffic can be determined, is carried in the message.

Such parameter value may be for instance an Access Point Name (APN), which will be used in the following description.

At step 210 the Serving GPRS Support Node 3 checks the Access Point Name and, at step 211 the Serving GPRS Support Node 3 evaluates if the Access Point Name is requesting the use of an S4 track.

If this is the case, at step 212, Lawful Interception is skipped, since a request for an S4 track necessarily implies that traffic from the User Equipment 1 crosses Serving Gateway 4, on which Lawful Interception has been activated.

Similarly, at step 210 the Access Point Name is checked by the Serving Gateway 4, which, at step 211, evaluates if the Access Point Name is related to a Packet Data Network Gateway 5 in the same Public Land Mobile Network. In this case Lawful Interception is equally skipped, since this implies that traffic from User Equipment 1 crosses Packet Data Network Gateway 5, on which Lawful Interception has been activated.

According to a first aspect of the invention, optimisation of usage of resources for Lawful Interception is therefore achieved by skipping Lawful Interception requests when the same are being applied at a different node located in the same network, particularly at a different node located downstream of the node that is skipping Lawful Interception.

According to a second aspect of the invention, optimisation of usage of resources for Lawful Interception is achieved by discarding redundant data.

Figure 2:
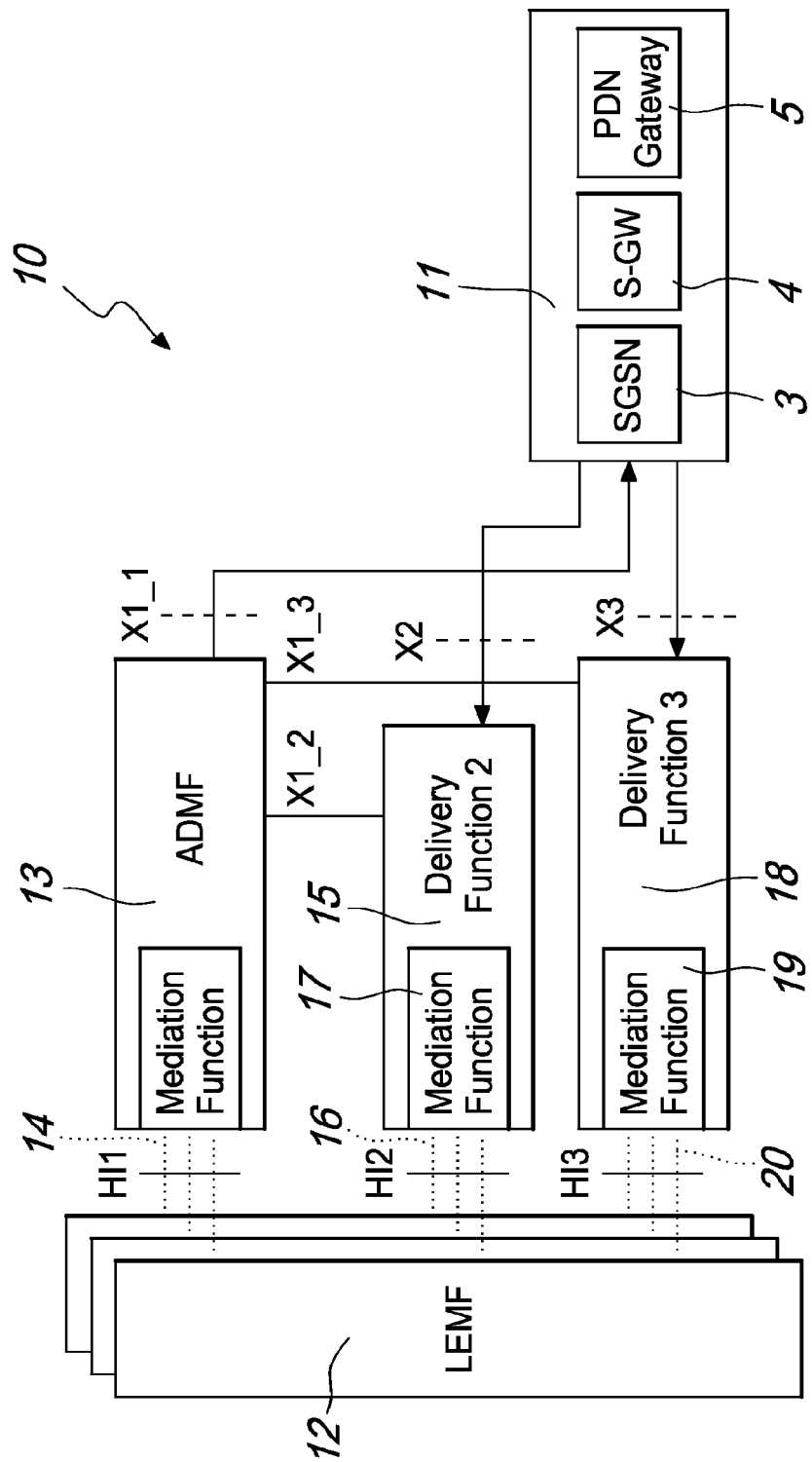
FIG. 2 is an arrangement of a Lawful Interception system, in which one or more of a Serving GPRS Support Node, a Serving Gateway and a Packet Data Network Gateway (PDN-GW) may operate as Intercepting Control Elements.

With reference to FIG. 2, an architecture for accessing communications related data in a Lawful Interception system 10 according to such second aspect of the invention is disclosed.

A Lawful Interception system 10 may comprise Intercepting Control Elements 11 providing the user equipment 1 of the target user with access to the telecommunications network.

One or more of Serving GPRS Support Node 3, Serving Gateway 4 and Packet Data Network Gateway 5 may be defined as Intercepting Control Elements 11, in order to intercept signalling and content of communication for a mobile node 1 that is a target for Lawful Interception.

Lawful Interception system 10 may further comprise one or more Law Enforcement Monitoring Facilities (LEMFs) 12, through which respective Law Enforcement Agencies (LEAs) may receive interception information.

An Administration Function (ADMF) entity 13 may be further configured for sending target identity and Lawful Interception authorization data received from the respective Law Enforcement Agencies to the Intercepting Control Elements 11.

Administration Function 13 may interface through a first Handover Interface 14 (HI1) with all the Law Enforcement Agencies that may require interception in the intercepting network and may keep the intercept activities of individual Law Enforcement Agencies separate and interface to the intercepting network. Administration Function 13 may also be used to hide from Intercepting Control Elements 11 that multiple activations by different Law Enforcement Agencies on the same target may have been active. Moreover, Administration Function 13 may be partitioned to ensure separation of provisioning data from different agencies.

Every physical Intercepting Control Element 11 may be linked to Administration Function 13 by means of its own X1_1 interface. Consequently, every single Intercepting Control Element 11 may perform interception, i.e. activation, deactivation, interrogation as well as invocation, independently from other Intercepting Control Elements 11.

In order to deliver the intercepted information to Law Enforcement Agencies, two Delivery Functions (DF) entities may be provided, each exchanging respective portions of information with Administration Function 13, through X1_2 and X1_3 interfaces, and the Law Enforcement Monitoring Facility 12.

In particular, a Delivery Function DF2 entity 15 may be configured to receive Intercept Related Information (IRI) from Intercepting Control Element 11, through an X2 interface, and to convert and distribute the Intercept Related Information to the relevant Law Enforcement Agencies via a second Handover Interface 16 (HI2) by means of a Mediation Function (MF) 17.

The Intercept Related Information may be a collection of information or data associated with telecommunication services involving the target identity, such as call associated information or data, e.g. unsuccessful call attempts, service associated information or data, e.g. service profile management by subscriber, and location information.

A Delivery Function DF3 entity 18 may be configured to receive Content of Communications (CC) information from Intercepting Control Elements 11 through an X3 interface, and to convert and distribute such information to the relevant Law Enforcement Agency through Mediation Function 19 and a third Handover Interface (HI3) 20.

The Content of Communications may be information different from the Intercept Related Information, which is exchanged between two or more users of a telecommunications service and, more in general, may include information which, as part of some telecommunications service, could be stored by one user for subsequent retrieval by another user.

All the traffic information may be used for proper storage in order to satisfy possible legal requirements concerning data retention.

Figure 3:
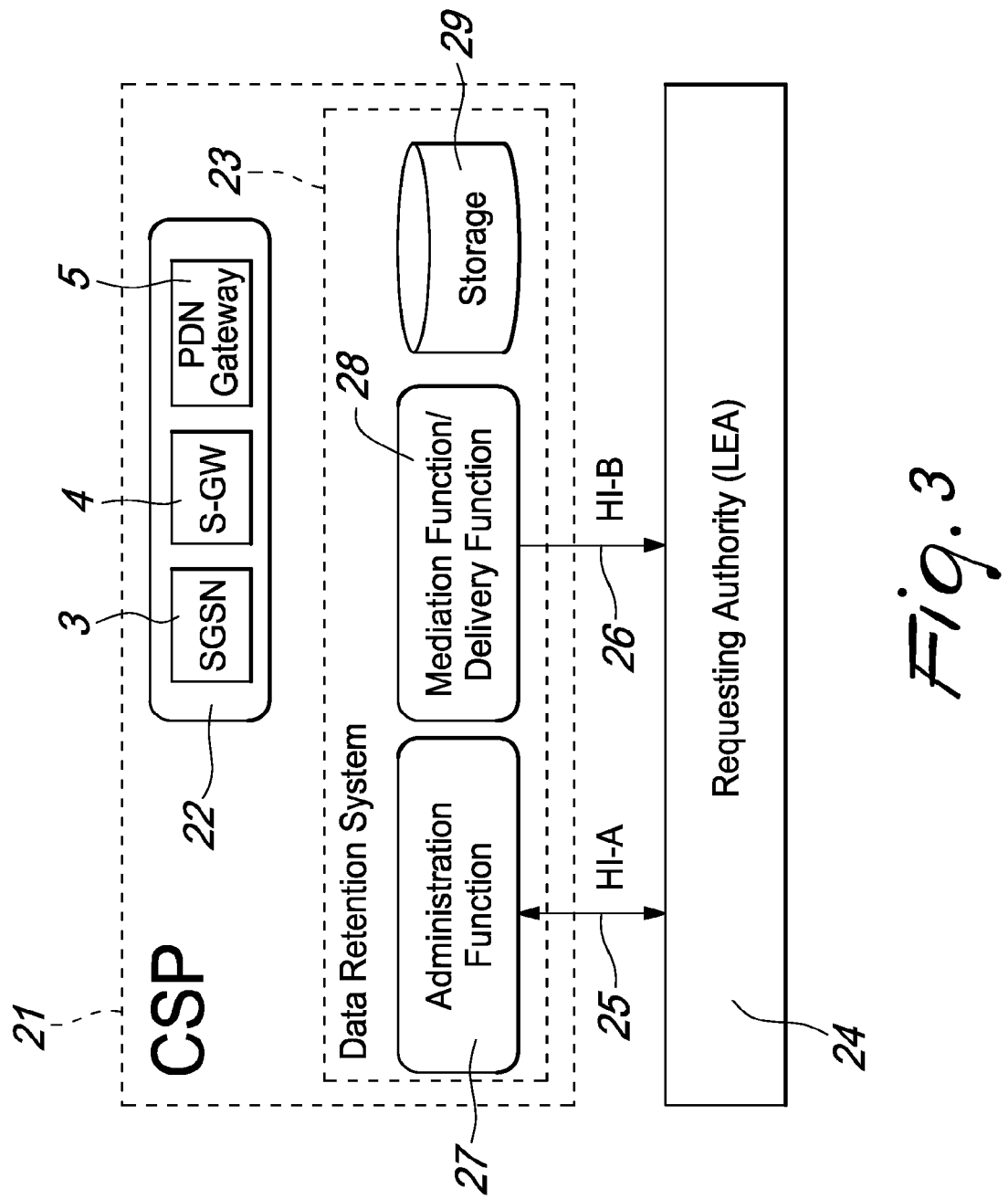
FIG. 3 is an arrangement of a Lawful Interception system, in which one or more of a Serving GPRS Support Node, Serving Gateway and Packet Data Network Gateway may act as Data Retention sources.

In this respect, FIG. 3 depicts an arrangement for retaining data in a Communication Service Provider 21 (CSP). Specifically, the Communication Service Provider 21 may be provided with a Data Retention System (DRS) 23 for exchanging retained data relating information with a Requesting Authority 24, which may be a Law Enforcement Agency (LEA).

Communication Service Provider 21 may include a Serving GPRS Support Node 3, a Serving Gateway 4 and a Packet Data Network Gateway 5, configured to operate as Data Retention sources.

Data exchanged between Communication Service Provider 21 and Requesting Authority 24 may comprise requests from the Requesting Authority 24, corresponding responses from the Data Retention System 23 and other data retention information, such as results of the requests and acknowledgements of receipt. The interfaces through which Communication Service Provider 21 and Data Retention System 23 exchange the above data with the Requesting Authority are denoted as Handover Interfaces.

The generic Handover Interface adopts a two-port structure in which administrative request/response information and Retained Data information are logically separated. In particular, a first Handover Interface port HI-A 25 may be configured to transport various kinds of administrative, request and response information from/to the Requesting Authority 24 and an organization at the Communication Service Provider 21 that is responsible for Retained Data matters, identified by an Administration Function 27.

A second Handover Interface HI-B 26 may be configured to transport the retained data information stored in a repository 29 from the Communication Service Provider 21 to the Requesting Authority 24. The individual retained data parameters have to be sent to the Requesting Authority 24 at least once, if available. To this aim, a Mediation/Delivery function 28 may be provided, for retrieving retained data from repository 29 and forwarding such data to Requesting Authority 24 in a suitable format through the HI-B 26.

Figure 5:
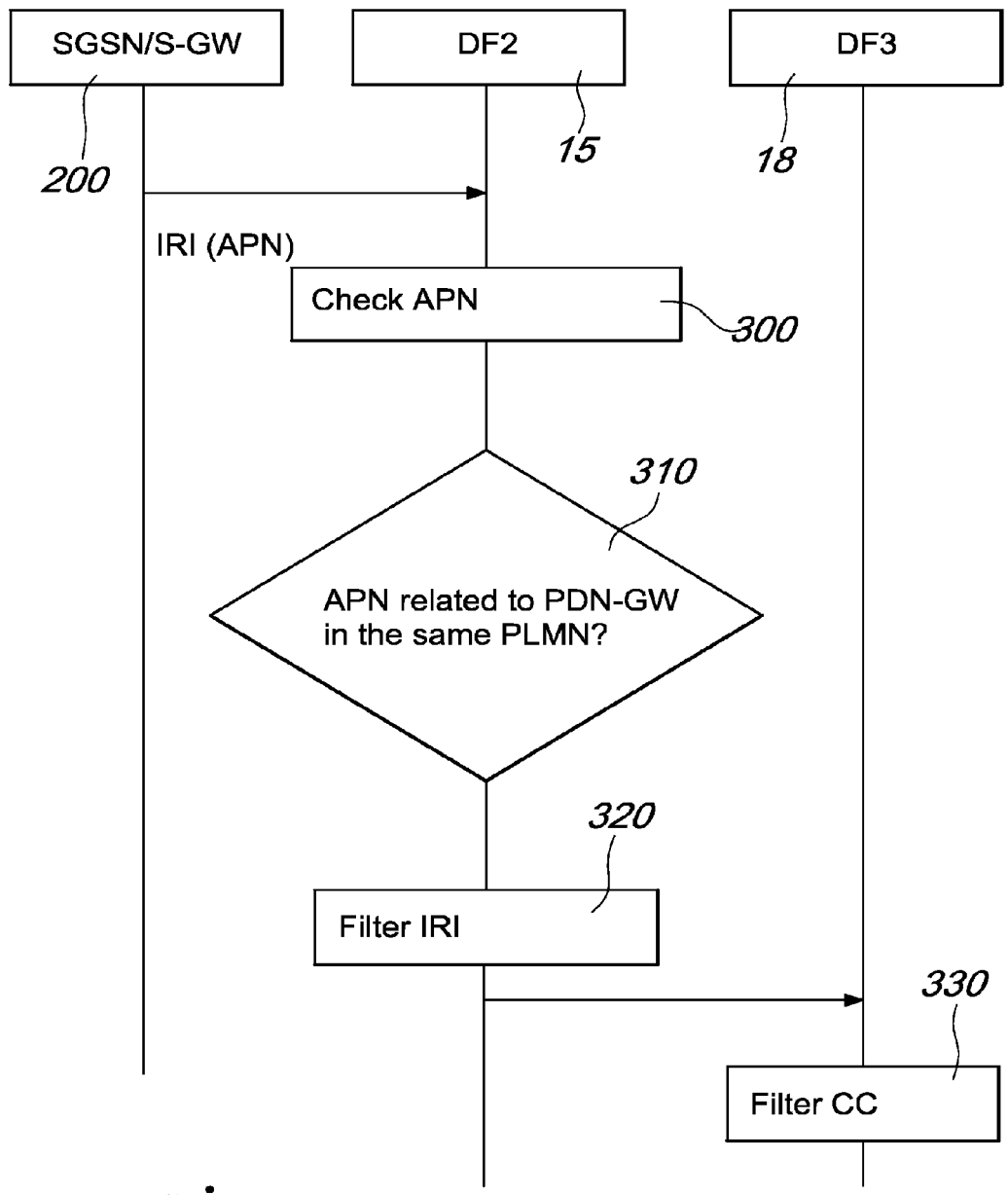
FIG. 5 is a flow diagram showing a method for discarding intercepted data according to another aspect of the present invention.

A second aspect of the present invention is now described with respect to the data flow diagram of FIG. 5.

FIG. 5 shows three network elements: node 200, which can be either a Serving GPRS Support Node 3 or a Serving Gateway 4, Delivery Function 2 (DF2) 15 and Delivery Function 3 (DF3) 18.

Node 200 may send Intercept Related Information (IRI) through an X2 interface to DF2 15. The Intercept Related Information may include a parameter value from which a route of the user's traffic can be determined.

Such parameter value may be for instance an Access Point Name (APN), which will be used in the following description.

At step 300, the Access Point Name is checked by the DF2 15, which, at step 310, evaluates if the Access Point Name is related to a Packet Data Network Gateway 5 in the same Public Land Mobile Network.

In this case, at step 320 the DF2 15 discards Intercept Related Information data. Furthermore, DF2 15 sends a message to DF3 18 indicating to filter the corresponding Content of Communication (CC) data.

At step 330, Communication Content data is then filtered by DF3 18.

According to this second aspect of the invention, intercepted data from a node is discarded when the same data has been intercepted or retained in a different node crossed by the same traffic from User Equipment 1.

It has been shown that the invention fully achieves the intended aim and objects, since it allows to avoid activating, maintaining or delivering multiple instances of intercept products for the same target subscriber, which improves performance of nodes involved in Lawful Interception, both on the side of the operator and of Legal Enforcement Agencies, in terms of resource usage, including bandwidth and storage size.

In particular the invention allows saving Lawful Interception capacity in Serving GPRS Support Nodes 3 and in Serving Gateways Nodes 4.

Lawful Interception capacity saving is obtained also in the processing at DF/MF, as the filtering may be performed at the Serving GPRS Support Node directly, without involving DF/MF for filtering. Lawful Interception capacity saving will consequently be obtained at the LEMF.

Furthermore, the invention allows bandwidth saving on Lawful Interception interfaces between a Serving GPRS Support Node and DF/MF (X interfaces), since filtering is done at the network element and, consequently, on the HI interfaces between the DF/MF and the LEMF.

Both capacity and bandwidth saving results in reduced costs for transmission to the Law enforcement, which is a benefit also for Law Enforcement Agencies.

Clearly, several modifications will be apparent to and can be readily made by the skilled in the art without departing from the scope of the present invention.

Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for reducing consumption of resources for lawful interception or retention data related to traffic concerning a 2G/3G target mobile connected to a telecommunications network interworking with Evolved Packet System, comprising the steps of:
   at a first node, detecting a parameter value in traffic for which lawful interception or data retention has been activated;
   based at least partially on said parameter value, evaluating whether said traffic will cross a second node on which lawful interception or data retention has been activated; and
   if said traffic will cross the second node on which lawful interception or data retention has been activated, foregoing lawful interception or data retention for the traffic at the first node.

2. The method of claim 1 wherein said parameter value is an Access Point Name.

3. The method of claim 1 wherein said first node is a Serving GPRS Support Node and said second node is a Serving Gateway.

4. The method of claim 1 wherein said first node is a Serving Gateway and said second node is a Packet Data Network Gateway.

5. The method of claim 1 wherein said first node is a Serving GPRS Support Node and said second node is a Packet Data Network Gateway.

6. The method of claim 4 wherein said Packet Data Network Gateway is located in the same network and in the same country as said first node.

7. The method according to claim 1, wherein said step of foregoing lawful interception or data retention at the first node includes discarding a lawful interception request before data interception or data retention is applied.

8. The method according to claim 7, wherein said step of discarding lawful interception requests before data interception or data retention is applied is based on whether said Access Point Name requests use of the S4 track.

9. The method according to claim 1, wherein said step of foregoing lawful interception or data retention at the first node includes discarding intercepted data.

10. The method according to claim 9, wherein said step of discarding intercepted data includes:
    verifying Intercept Related Information received at a DF2/MF2 function;
    if said traffic will be intercepted or retained at the second node crossed by said traffic: discarding said IRIs and discarding corresponding Content of Communication received at a DF3/MF3 function.

11. A Lawful Interception system for interception or retention of data related to traffic associated with a target user equipment in a 2G/3G telecommunications network interworking with Evolved Packet System, the system comprising:
    a first node; and
    a second node downstream from the first node,
    wherein the first and second nodes are configured to operate as Intercepting Control Elements or Data Retention sources, and
    wherein said first node is configured to detect a parameter value in traffic for which lawful interception or data retention has been activated and, based at least partially on whether said parameter value indicates the traffic will cross the second node, determine whether to forego lawful interception or data retention for the traffic at the first node.

12. The Lawful Interception system of claim 11 wherein said parameter value is an Access Point Name.

13. The Lawful Interception system of claim 11 wherein said first node is a Serving GPRS Support Node and said second node is a Serving Gateway.

14. The Lawful Interception system of claim 11 wherein said first node is a Serving Gateway and said second node is a Packet Data Network Gateway.

15. The Lawful Interception system of claim 11 wherein said first node is a Serving GPRS Support Node and said second node is a Packet Data Network Gateway.

16. The Lawful Interception system of claim 11 wherein said Packet Data Network Gateway is located in the same network and in the same country as said first node.

17. A Serving GPRS Support Node configured to operate as an Intercepting Control Element or Data Retention source for a Lawful Interception system, wherein said Serving GPRS Support Node is configured to:
 detect a parameter value in traffic for which lawful interception or data retention has been activated,
 based at least partially on said parameter value, evaluate whether said traffic will cross a second node on which lawful interception or data retention has been activated and, if said traffic will cross the second node, forego lawful interception or data retention for the traffic at the Serving GPRS Support Node.

18. A Service Gateway configured to operate as an Intercepting Control Element or Data Retention source for a Lawful Interception system, wherein said Service Gateway is configured to:
 detect a parameter value in traffic for which lawful interception or data retention has been activated,
 based at least partially on said parameter value, evaluate whether said traffic will cross a second node on which lawful interception or data retention has been activated and, if said traffic will cross the second node, forego lawful interception or data retention for the traffic at the Service Gateway.

19. A telecommunications network comprising a Law Enforcement system according to claim 11.

20. A non-transitory computer readable storage medium containing instructions that, when run in at least one of a Serving GPRS Support Node or a Serving Gateway, cause said at least one of a Serving GPRS Support Node or Serving Gateway to operate as an Intercepting Control Element or Data retention source operable in a Lawful Interception system, so that said Serving GPRS Support Node or said Serving Gateway, when executing the instructions, performs the steps of:
 detect a parameter value in traffic for which lawful interception or data retention has been activated,
 based at least partially on said parameter value, evaluate whether said traffic will cross a second node on which lawful interception or data retention has been activated and, if said traffic will cross the second node, forego lawful interception or data retention for the traffic at the Serving GPRS Serving GPRS Support Node or said Serving Gateway.

* * * * *

UNITED STATES PATENT AND TRADEMARK OFFICE
CERTIFICATE OF CORRECTION

PATENT NO. : 9,762,620 B2
APPLICATION NO. : 14/691749
DATED : September 12, 2017
INVENTOR(S) : Iovieno et al.

Page 1 of 1

It is certified that error appears in the above-identified patent and that said Letters Patent is hereby corrected as shown below:

On the Title Page

In Item (56), under "OTHER PUBLICATIONS", in Column 2, Line 4, delete "Acccess" and insert -- Access --, therefor.

In the Specification

In Column 1, Line 8, delete "2011," and insert -- 2011, now Pat. No. 9,042,388, --, therefor.

In Column 1, Line 34, delete "service Switching" and insert -- Switching --, therefor.

In Column 3, Line 53, delete "Policy" and insert -- Policy and --, therefor.

In Column 4, Line 17, delete "subscriber 1" and insert -- subscriber --, therefor.

In the Claims

In Column 10, Line 5, in Claim 19, delete "Enforcement" and insert -- Interception --, therefor.

In Column 10, Line 22, in Claim 20, delete "Serving GPRS Serving GPRS" and insert -- Serving GPRS --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*